United States Patent
Yuang et al.

(10) Patent No.: US 7,301,943 B2
(45) Date of Patent: Nov. 27, 2007

(54) QOS-ORIENTED BURSTIFICATION METHOD SUPPORTING VARIOUS GRADES OF BURSTIFICATION DELAY GUARANTEE

(75) Inventors: Maria C. Yuang, Hsinchu (TW); Po-Lung Tien, Hsinchu (TW); Ju-Lin Shih, Hsinchu (TW); Yao-Yuan Chang, Taipei (TW); Steven S. W. Lee, Bade (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 1057 days.

(21) Appl. No.: 10/207,879

(22) Filed: Jul. 31, 2002

(65) Prior Publication Data

US 2004/0022248 A1 Feb. 5, 2004

(51) Int. Cl.
*H04L 12/56* (2006.01)
(52) U.S. Cl. ............ 370/388; 370/395.42; 370/395.7; 370/415; 370/477
(58) Field of Classification Search ............ 370/395.7, 370/412, 415, 468, 477, 537, 386, 388, 395.4, 370/395.42
See application file for complete search history.

(56) References Cited

U.S. PATENT DOCUMENTS

| | | | |
|---|---|---|---|
| 6,101,193 A * | 8/2000 | Ohba | 370/429 |
| 6,353,616 B1 * | 3/2002 | Elwalid et al. | 370/443 |
| 6,510,160 B1 * | 1/2003 | Nikuie et al. | 370/412 |
| 6,980,534 B1 * | 12/2005 | Nee et al. | 370/329 |
| 7,023,866 B2 * | 4/2006 | Giroux et al. | 370/412 |
| 7,046,688 B2 * | 5/2006 | Amou et al. | 370/418 |
| 7,110,358 B1 * | 9/2006 | Clinton et al. | 370/235 |
| 7,110,411 B2 * | 9/2006 | Saidi et al. | 370/395.4 |
| 2003/0072317 A1 * | 4/2003 | Yuang et al. | 370/412 |

OTHER PUBLICATIONS

M.C. Yuang, J. Shih, and P.L. Tien, "QoS burstification for optical burst switched WDM networks", Optical Fiber Communication Conference and Exhibit 2002, Mar. 22, 2002, p. 781-783.*
M.C. Yuang And P.L. Tien; "QoS Burstification For Optical Burst Switched WDM Networks"; Optical Fiber Communication Conference And Exhibhit; Mar. 19-21, 2002, 4 pages.

(Continued)

*Primary Examiner*—Hassan Kizou
*Assistant Examiner*—Brian T O'Connor
(74) *Attorney, Agent, or Firm*—Bacon & Thomas, PLLC (57) ABSTRACT

There is disclosed an QoS-oriented burstification method supporting various grades of burstification delay guarantee. For the arrival packets, the packets are sequentially inserted in a sequence of windows on weight basis, thereby forming a queue. The window size together with the weight of each flow determines a maximum number of packets of each flow in a window. For the departure packets, there is generated a burst consisting of a plurality of packets from the head of the queue when either a total number of packets reaches a maximum burst size or a burst assembly timer expires.

7 Claims, 7 Drawing Sheets

Initialization() /.. * idle to busy */
  1. $cw \leftarrow 1$;
  2. for (each flow $i$) do $w_i = W^* w_i^* / \Sigma w_k^*, lw_i \leftarrow 1; c_i \leftarrow w_i;$ endfor
  3. $BATr \leftarrow BAT$;

Arrival($Pi$) /.. * newly arriving packet */
  Determine the window in which $Pi$ can be placed;
  1. while ($c_i < 1$) $lw_i \leftarrow lw_i + 1; c_i \leftarrow w_i + c_i$; endwhile
    Place the packet in window $lw_i$ and update $c_i$;
  2. Enqueue($lw_i, P_i$); $c_i \leftarrow c_i - 1$ Departure($Bu$) /.. * $BATr$ expires or the # of packets >= $Bmax$ */
  Remove the burst, $Bu$, from the head of the queue;
  1. Dequeue($Bu$);
    Update information if $Bu$ crosses window boundary;
  2. for (each flow $i$ s.t. $lw_i$=one of passed window indices)
  3. do $lw_i \leftarrow$ new current window index; $c_i \leftarrow w_i$; endfor
  4. $cw \leftarrow$ new current window index ;
    Reset the $BATr$;
  5. $BATr \leftarrow BAT$; endif

OTHER PUBLICATIONS

Abhay K. Parekh, Member, IEEE, and Robert G. Gallager, Fellow, IEEE; "A Generalized Processor Sharing Approach To Flow Control In Integrated Services Networks: The Single-Node Case" Jun. 1993; vol. 1, No. 3, pp. 344-357.

Abhay K. Parekh, Member, IEEE, and Robert G. Gallager, Fellow, IEEE, "A Generalized Processor Sharing Approach To Flow Control In Integrated Services Networks: The Multiple Node Case" Apr. 1994; vol. 2, No. 2, pp. 137-150.

Jon C.R. Bennett, Hui Zhang, Fore Systems, School of Computer Science Carnegie Mellon University; "WF2Q: Worst-case Fair Weighted Fair Queuing"; 1996; pp. 120-128.

S. Jamaloddin Golestani; "A Self-Clocked Fair Queuing Scheme For Broadband Applications"; 1994; pp. 636-646.

* cited by examiner

Initialization() / .. * idle to busy */

1. $cw \leftarrow 1$;

2. for (each flow $i$) do $w_i = W * w_i^* / \Sigma w_k^*$; $lw_i \leftarrow 1$; $c_i \leftarrow w_i$; endfor

3. $BATr \leftarrow BAT$;

Arrival($Pi$) / .. * newly arriving packet */

Determine the window in which $Pi$ can be placed;

1. while ($c_i < 1$) $lw_i \leftarrow lw_i + 1$; $c_i \leftarrow w_i + c_i$; endwhile

Place the packet in window $lw_i$ and update $c_i$;

2. Enqueue($lw_i, P_i$); $c_i \leftarrow c_i - 1$

Departure($Bu$) / .. * $BATr$ expires or the # of packets $>=$ Bmax */

Remove the burst, $Bu$, from the head of the queue;

1. Dequeue($Bu$);

Update information if $Bu$ crosses window boundary;

2. for (each flow $i$ s.t. $lw_i$=one of passed window indices)

3. do $lw_i \leftarrow$ new current window index; $c_i \leftarrow w_i$; endfor

4. $cw \leftarrow$ new current window index ;

Reset the $BATr$;

5. $BATr \leftarrow BAT$; endif

QOS-ORIENTED BURSTIFICATION METHOD SUPPORTING VARIOUS GRADES OF BURSTIFICATION DELAY GUARANTEE

BACKGROUND OF THE INVENTION

1. Field of the Invention

The present invention relates to the field of optical burst switched networks, and particularly to an QoS-oriented burstification method supporting various grades of burstification delay guarantee on the basis of delay requirement.

2. Description of Related Art

The ever-growing demand for Internet bandwidth and recent advances in optical Wavelength Division Multiplexing (WDM) technologies brings about fundamental changes in the design and implementation of the next generation optical Internet. Current applications of WDM mostly follow the circuit-switching paradigm by making relatively static utilization of individual WDM channels. As opposed to circuit switching, optical packet switching technologies enable fine-grained on-demand channel allocation and have been envisioned as an ultimate networking solution of IP over WDM. Nevertheless, optical packet switching currently faces some technological limitations, such as the lack of optical buffer, contention resolution, and switching overhead. Optical burst switching (OBS), as a result, has been emerged as a prominent coarse-grained optical packet switching solution attempting to combine the best of both optical circuit and packet switching while circumventing their limitations. Such technology, on the other hand, raises significant Quality-of-Service (QoS) challenges that need to be examined from both technical and economic perspectives.

Figure 1:
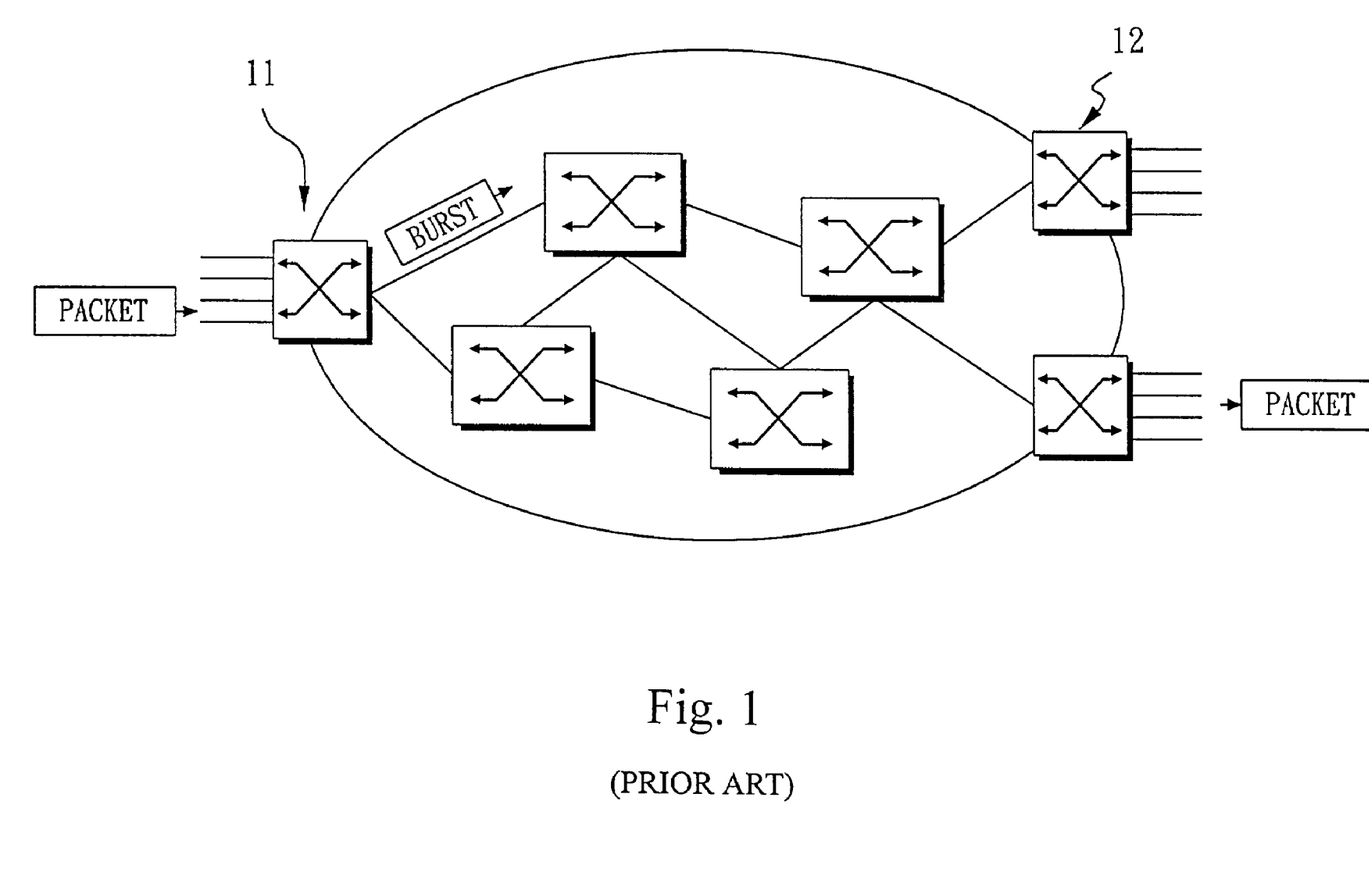
FIG. 1 schematically illustrates the architecture of an optical burst switching network.

Pertaining to OBS, as shown in FIG. 1, each ingress router 11 is required to perform the burstification process, namely the assembly of incoming IP packets destined for the same egress router 12 into bursts. Bursts are disassembled into packets at the egress router 12. In the system, assuming the propagation delay is negligible, a packet from ingress router to egress router incurs an end-to-end delay comprising the burstification delay and the inter-nodal switching delay. Therefore, it is desired to provide a QoS-oriented burstification mechanism offering different classes of burstification-delay guarantees for packets.

Assuming First Come First Service (FCFS), there are two basic burstification schemes: Burst Assembly Time (BAT)-based, and Fixed Burst Size (FBS)-based. In the BAT-based scheme, packets arrive during a BAT are assembled into a burst. The scheme assures bounded burstification delay but may result in lower throughput owing to bursts with few packets possibly generated. In contrast, the FBS-based scheme guarantees the generation of fixed-size bursts, however, at the expense of an increase in burstification delay.

With the delay-QoS taken into account, existing scheduling disciplines have placed emphasis on the design of scalable packet schedulers achieving fairness and delay QoS guarantee while retaining manageable complexity. In these schemes, all packets follow the exact departure order that is computed according to deadlines and virtual finishing times that are associated with packets. For burstification process, considering hundred or thousand of packets in a burst, the exact order of packets within a burst is completely insignificant. The above schemes are therefore economically unviable with respect to burstification process.

SUMMARY OF THE INVENTION

The object of the present invention is to provide an QoS-oriented burstification method supporting various grades of burstification delay guarantee on the basis of delay requirement.

To achieve the object, the QoS-oriented burstification method in accordance with the present invention includes the steps of: (A) determining a normalized weight $w_i$ of flow i whose weight is $w_i^*$ according to delay requirement; (B) sequentially inserting packets in a sequence of windows, each having a window size W, on weight basis, thereby forming a queue, wherein the window size together with the weight $w_i^*$ of each flow determines a maximum number of packets of each flow in a window; and (C) generating a burst consisting of a plurality of packets from a head of the queue when either a total number of packets reaches a maximum burst size Bmax or a burst assembly timer BATr expires.

Other objects, advantages, and novel features of the invention will become more apparent from the following detailed description when taken in conjunction with the accompanying drawings.

DETAILED DESCRIPTION OF THE PREFERRED EMBODIMENT

Figure 2:
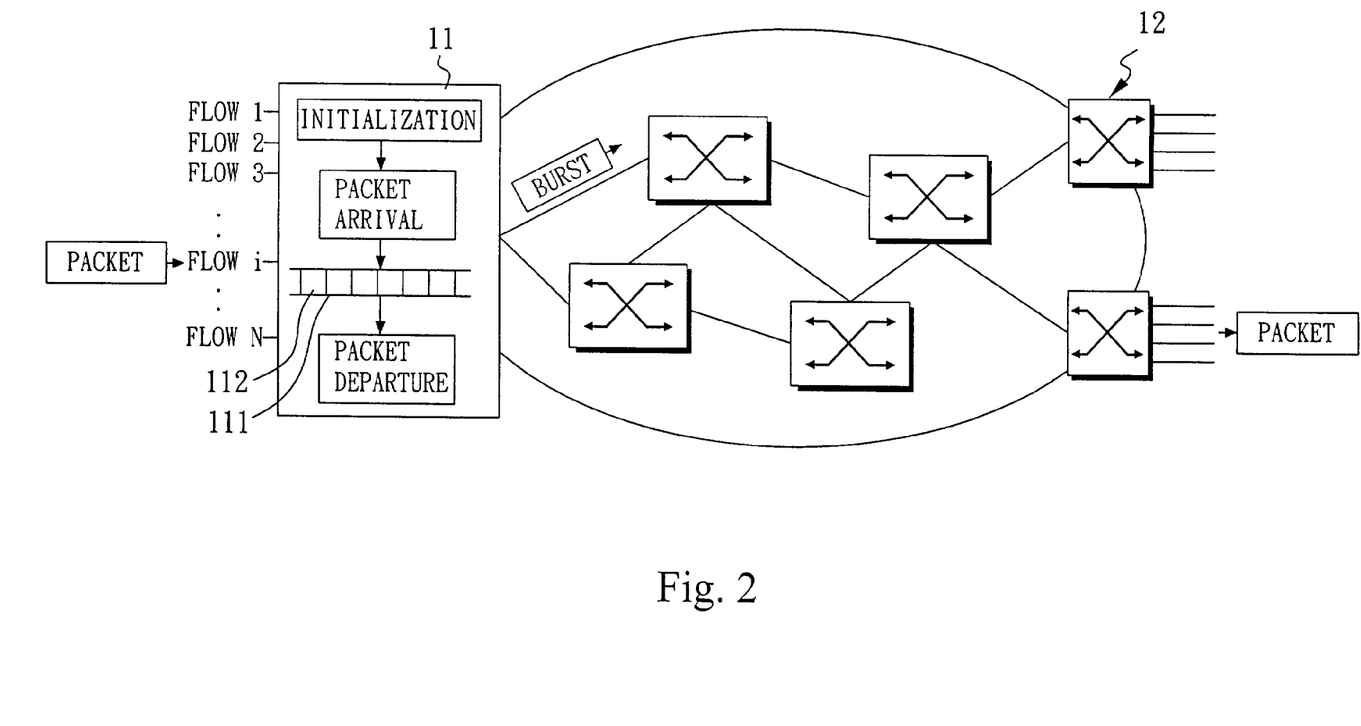
FIG. 2 shows a flowchart of the QoS-oriented burstification method capable of offering different flows of burstification delay guarantee in accordance with the present invention.

With reference to FIG. 2, there is shown the steps of the QoS-oriented burstification method capable of offering different flows of burstification delay guarantee and the corresponding optical burst switched network system, wherein the number of flows entering an ingress router 11 in the system is assumed to be N, and the packet from flow i having a weight wi* is processed by the present method and output through an output queue 111 having a plurality of windows 112, each having a window size W. The present method includes an initialization step, a packet arrival step and a packet departure step, and the corresponding algorithms are shown in FIG. 3.

Figure 3:
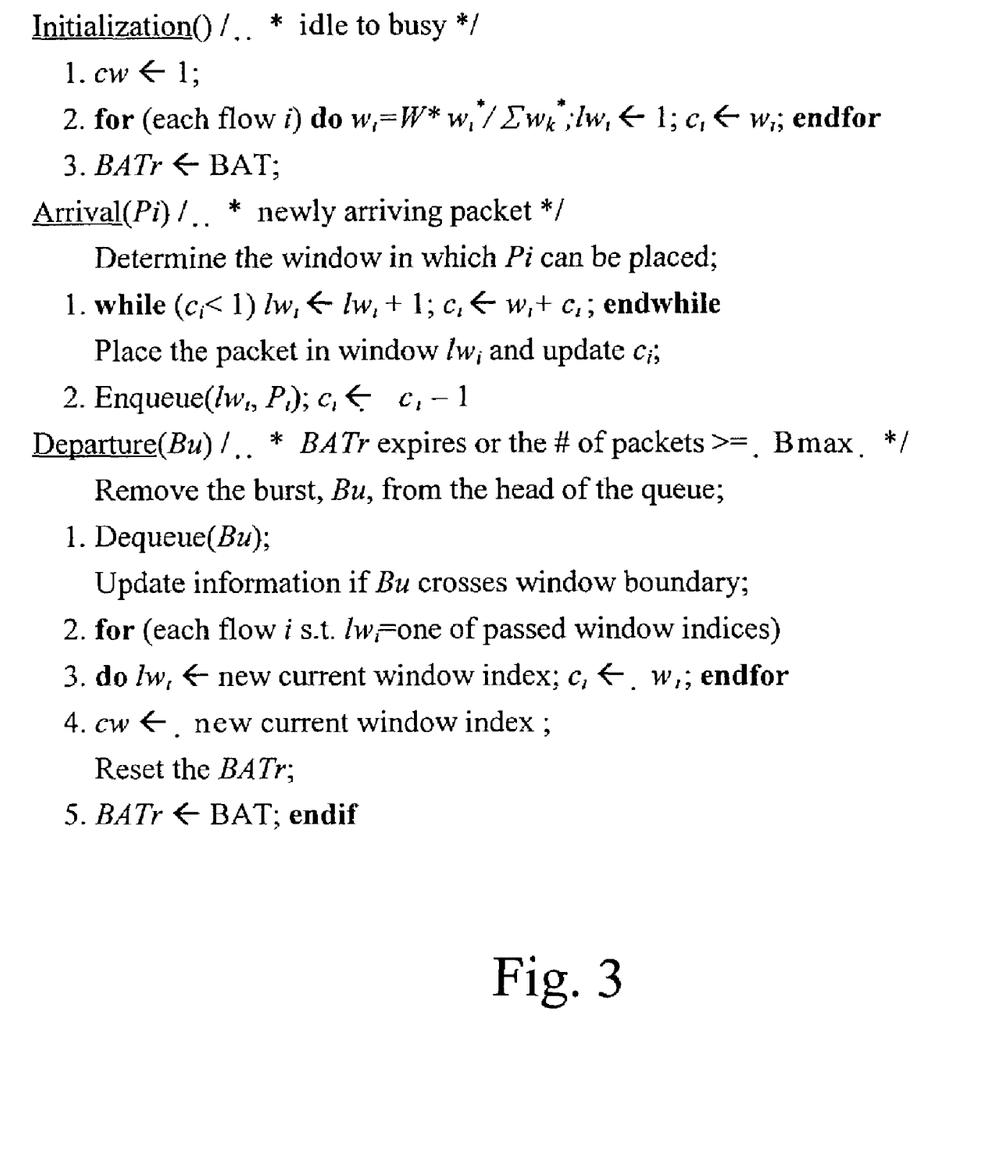
FIG. 3 shows an algorithm for implementing the QoS-oriented burstification method capable of offering different flows of burstification delay guarantee in accordance with the present invention.

With reference to the algorithm illustrated in FIG. 3, prior to every transition from being idle to busy, the system performs the initialization operation. Pointers are reset, the initial credit of each flow is initialized as its corresponding normalized weight, and the BATr is initialized from the system BAT value. The algorithm then asynchronously performs two tasks repeatedly: arrival and departure. As described above, the arrival task handles the placement (Enqueue) of newly arriving batches of packets in appropriate windows, the departure task performs sequential removal (Dequeue) of the burst from the head of the queue. Notice that, the system is facilitated with a burst identifier, which repeatedly monitors the occurrence of any two events: if BATr expires or the total number of packets reaches $B_{max}$. As soon as an event occurs, the control is passed to the departure task in which the burst is removed from the queue.

In the initialization step, the weight $w_i^*$ of flow i is determined according to delay requirement. Each flow i has a normalized weight $w_i$ defined as the maximum number of packets in a window for flow i, and uses a first index $1w_i$ to point to the window in which flow i's packet can be inserted and a second index cw to point to the current window to serve. For each flow, the normalized weight is determined by $w_i = W \times w_i^*/(w_1^* + w_2^* + \ldots w_N^*)$, and the credit is determined by credit $c_i = w_i$. A burst assembly timer BATr is assigned by a predetermined burst assembly time.

In the packet arrival step, the packets are sequentially inserted in a sequence of windows 112 in the queue 111 on weight basis. The window size W together with the normalized weight $w_i$ of each flow determines a maximum number of packets in a window. For each flow, in details, when a packet $P_i$ of flow i arrives, it is first determined whether the credit $c_i$ of flow i is smaller than 1. If the credit $c_i$ of flow i is smaller than 1, the credit is assigned by $c_i = c_i + w_i$, and the window index $1w_i$ is incremented. Such a process is repeated until the credit $c_i$ of flow i is not smaller than 1. When the credit $c_i$ of flow i is equal to or greater than 1, the packet $P_i$ is placed into the window 111 pointed by the window index $1w_i$, and the credit $c_i$ is decremented.

In the packet departure step, there is generated a burst consisting of a plurality of packets from the head of the queue 111 when either a total number of packets reaches a maximum burst size Bmax or the burst assembly timer BATr expires. In details, the packet departure step first starts to count a predefined burst assembly time. When the number of packets in the window 111 reaches a predefined maximum burst size or the burst assembly time is expired, a burst assembled by the packets is transmitted. After a burst transmits completely, for each flow i such that window index $1w_i$ is equal to one of passed window indices, $1w_i$ is replaced by the new current window index, and the credit is determined by $c_i = w_i$; the current window cw is replaced by a new current window index, wherein the new current window index points to the window which can be served next; and the burst assembly timer BATr is replaced by the burst assembly time.

Figure 4:
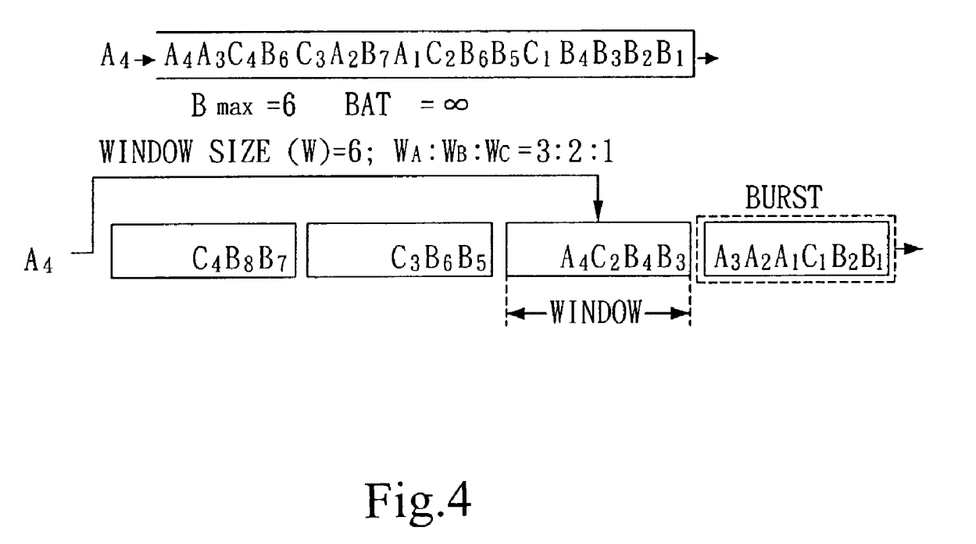
FIG. 4 shows the operation of an example of the QoS-oriented burstification method capable of offering different flows of burstification delay guarantee in accordance with the present invention.

FIG. 4 shows an example of the present method for offering quality of service in optical burst switched networks. In the example, the maximum burst size $B_{max}$ is 6. For ease of illustration, it is assumed a fixed packet size (i.e., packet size=1) and a BAT=∞ (i.e., BAT is not employed in the method). In addition, it is assumed W=6, and there are three flows A, B and C with normalized weights $w_A$, $w_B$, and $w_C$ (with respect to W) assigned as 3, 2, and 1, respectively. As shown in FIG. 4, upon the arrivals of packets B1 to B4, due to the allowance of only two packets ($w_B$=2) in a window for flow B, packets B3 and B4 are placed in the next window. Next, packet C1 arrives and is in turn sequentially placed in the first window due to sufficient credit. By the same token, three later arriving flow-A packets (A1 to A3) are all inserted in the first window due to $w_A$=3, completing the burst.

Figure 5:
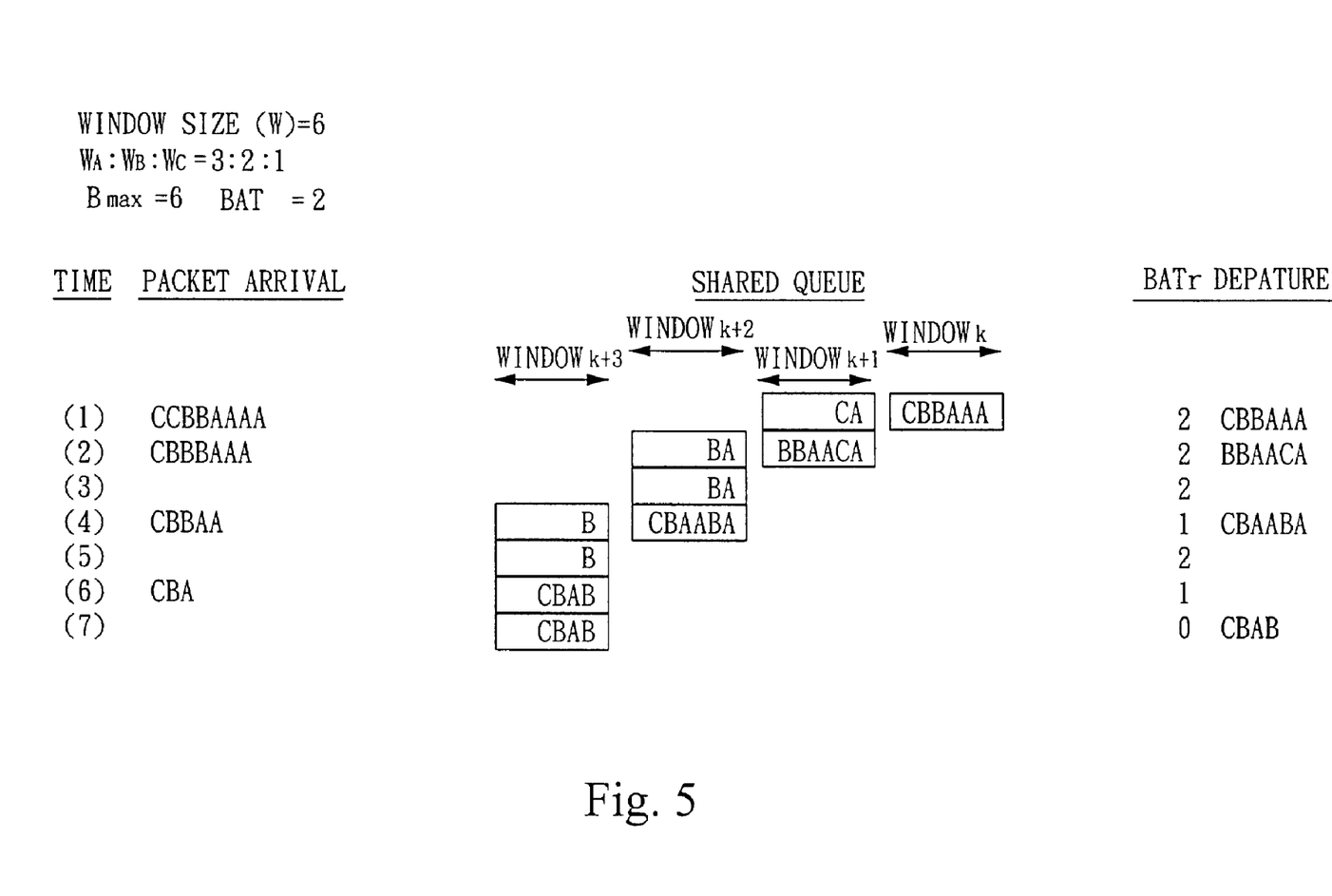
FIG. 5 shows the operation of another example of the QoS-oriented burstification method capable of offering different flows of burstification delay guarantee in accordance with the present invention.

FIG. 5 shows another example of the present method for offering quality of service in optical burst switched networks. Its window size W and normalized weights $w_A$, $w_B$, and $w_C$ are same with the previous example. This example is different from the previous one in that the burst assembly time BAT is 2. As shown, at first, the BATr is counted down from 2, and upon the arrivals of packets 'CCBBAAAA', packets 'CBBAAA' are placed in window k, assembled as a burst for departure. The remaining packets 'CA' are placed in the window k+1 for waiting other packets to be inserted as the BATr has not expired. At the next time period (2), packets 'CBBBAAA' arrive, and thus packets 'BBAA' is inserted into window k+1 and packets 'BA' are inserted into window k+1, resulting in assembling a burst 'BBAACA' for departure. Such a process is repeated, and finally, at the time period (6), the window k+1 has packets 'CBAB' and BATr=1. While at the time period (7), no packet arrives and BATr is expired, and thus a burst with packets 'CBAB' is assembled for departure.

To evaluate the performance of QBT, the event-based simulations of both QBT and FCFS-based schemes are performed under a variety of loads, BAT, and $B_{max}$ values. The observed performance metrics are burstification throughput fairness, mean burstification delay, and mean burst length. In all simulations, the system consisted of four flows (C1, C2, C3, and C4) with weights designated as 7, 6, 4, and 3, respectively. Each flow arrived from an OC-12 input link generating Poisson-distributed batch traffic, where the batch size followed the geometric distribution with the mean batch size=5 packets. In addition, all packets were 60 bytes in length, and served by an OC-48 output link, approximately 5 packets/slot, where each system time slot=1 μs. Within the WDM network, the switching delay was assumed 2 μs of duration. In turn, to achieve a link throughput of greater than 90%, one requires a mean burst size of approximately 100 packets long. Accordingly, the setting of $B_{max}$=100 packets and BAT≧20 slot time is employed in most simulation.

Figure 6:
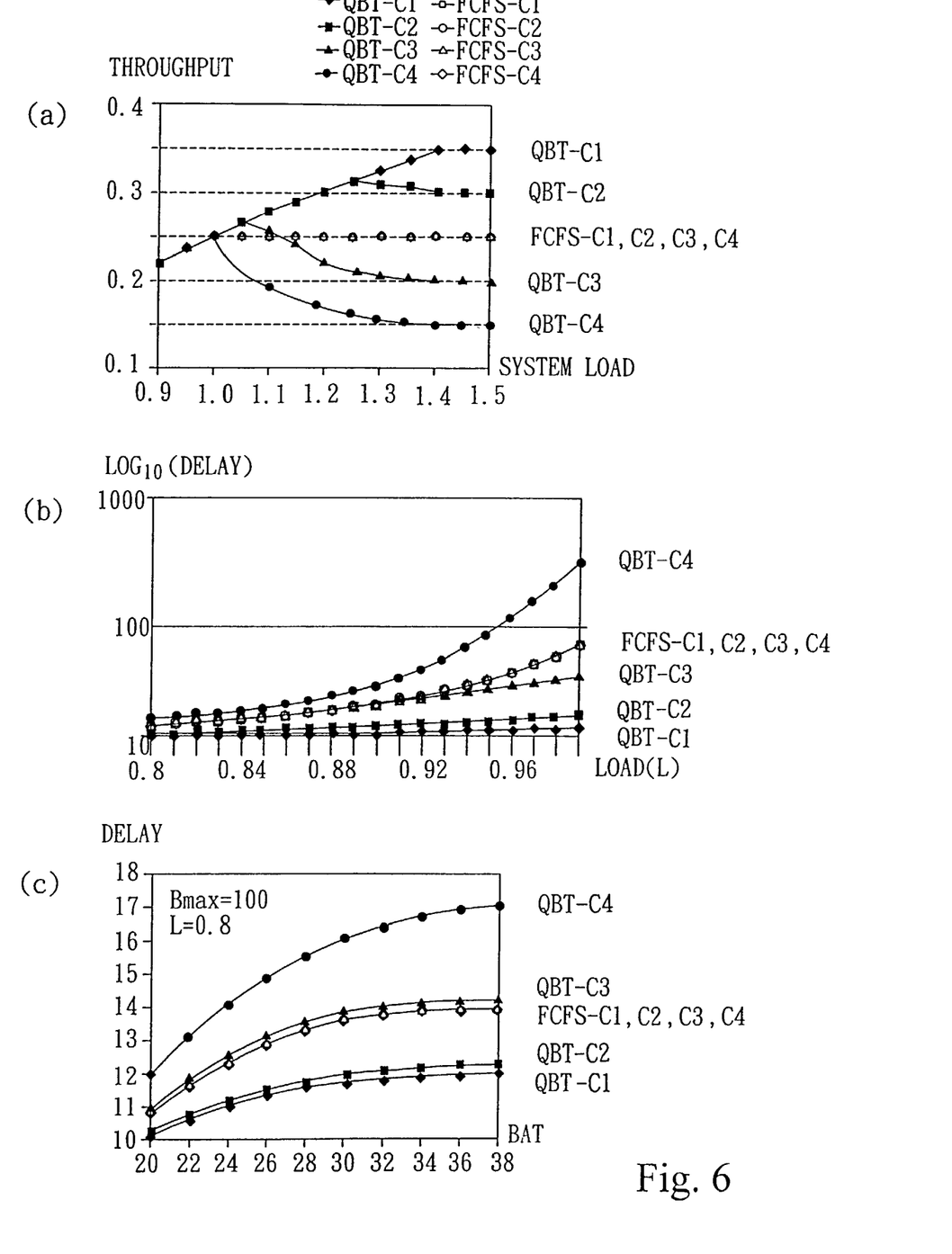
FIG. 6 shows the performance comparisons between the present method and FCFS-based burstification.
Figure 7:
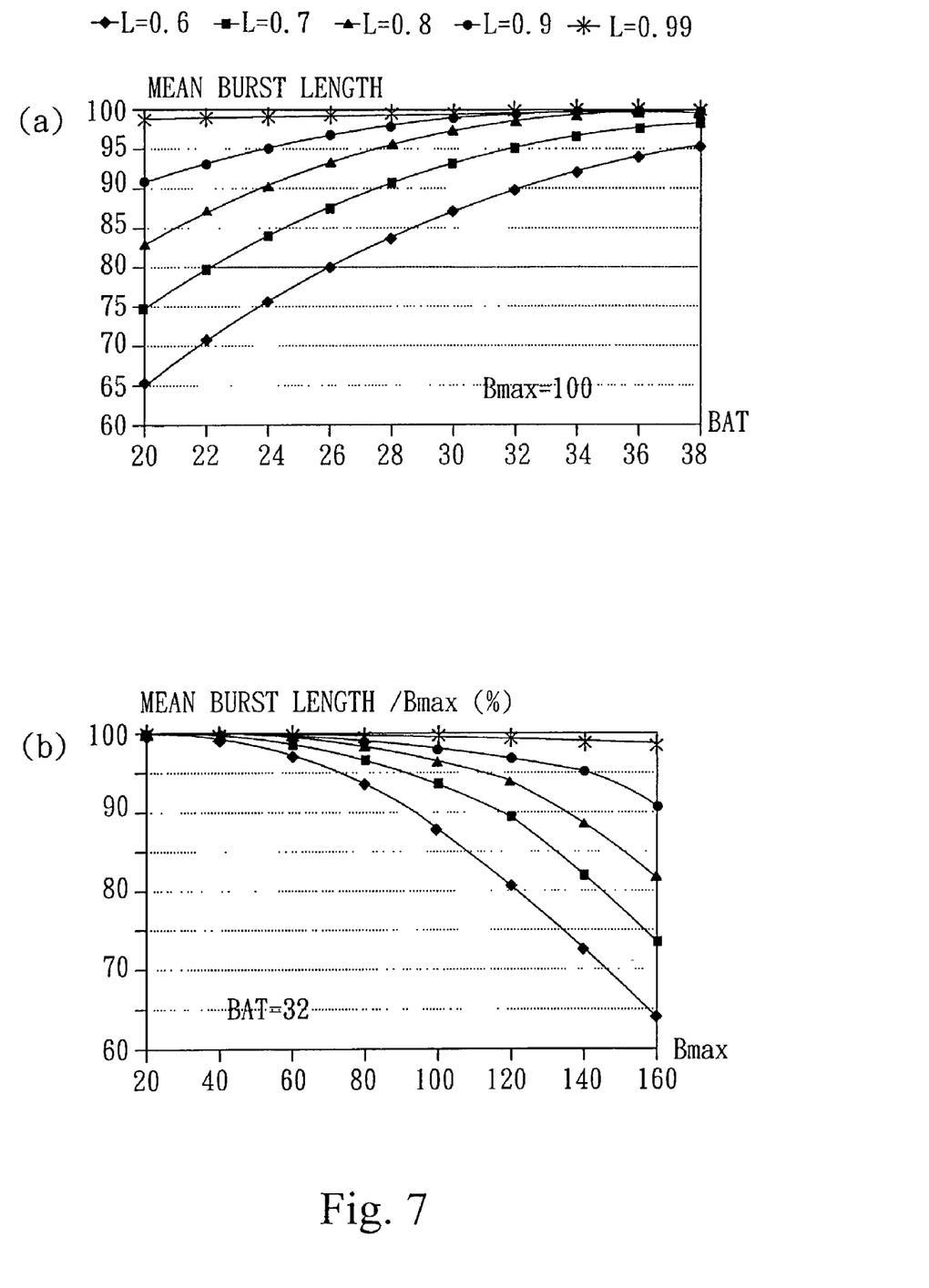
FIG. 7 shows the mean burst length as functions of BAT and $B_{max}$.

In FIG. 6, there are drawn the throughput and burstification-delay performance comparisons between the present method, denoted by QBT (QoS Burstification), and FCFS-based burstification under various normalized aggregate loads and BAT values. First, it is observed from FIG. 6(a) that before the system is saturated (load=1.0), all flows are allocated with identical bandwidth irrespective of their weights. As the system load increases toward saturation, lower-weight flows gradually release bandwidth, resulting in weight-proportional service to be fully exerted at load L=1.4 and beyond. As was expected, FCFS scheme indistinctively offers identical bandwidth to all four flows. It is further discovered from FIG. 6(b) that burstification delay increases exponentially with the offered load. Unlike the FCFS scheme that results in identically long delay for all flows particularly under heavy loads, the present method yields deteriorating delay only for low-priority flows (e.g., C4) in return for drastically improved delay for higher-priority flows (e.g., flows C1 and C2). Furthermore, it is delineated in FIG. 6(c) that burstification delay increases with the system BAT value but only to a certain extent. By further examining from FIG. 7 the impact of the BAT and $B_{max}$ values on link throughput in terms of the mean burst length, it is discovered that, to maintain a satisfactory mean burst length, the system must adopt a dynamically changing BAT value, which increases with the traffic load. An improper use of BAT values may result in unacceptable decrease in link throughput, as shown in FIG. 7(a).

Finally, FIG. 7(b) demonstrates the normalized mean burst length over the $B_{max}$ value. It is shown that under medium loads, in order to achieve invariantly high efficiency, the theoretical BAT value corresponding to a given $B_{max}$ value, which is BAT=$B_{max}$/5=32 in this case, should be at least linearly increased adapting to reduced traffic loads.

Although the present invention has been explained in relation to its preferred embodiment, it is to be understood that many other possible modifications and variations can be made without departing from the spirit and scope of the invention as hereinafter claimed.

What is claimed is:

1. An QoS-oriented burstification method supporting various grades of burstification delay guarantee on the basis of delay requirement in an optical burst switched network system, comprising the steps of:
   (A) determining a normalized weight $w_i$ of flow I whose weight is $w_1^*$ according to delay requirement;
   (B) sequentially inserting packets in a sequence of windows, each having a window size W, on weight basis, thereby forming a queue, wherein the window size together with the normalized weight $w_i$ of each flow determines a maximum number of packets of each flow in a window; and
   (C) generating a burst consisting of a plurality of packets from a head of the queue when either a total number of packets reaches a maximum burst size Bmax or a burst assembly timer BATr, pre-assigned with a burst assembly time, expires.

2. The method as claimed in claim 1, wherein in step (A), each flow I has an index $1w_i$ to point to the window which flow i's packet can be inserted, and uses a credit $c_i$ to count the remaining space in window $1 w_i$ for flow i; an index cw is provided to point to the current window to serve, and step (A) further comprises the steps of:
   (A1) when a first packet arrives, changing a state for the system from idle to busy;
   (A2) assigning the current window cw to the first window index;
   (A3) for each flow i, assigning $1w_i$ to the first window index, normalized weight $w_i=W \times w_i^*/(w_1^*+w_2^*+ \ldots w_N^*)$, where N is a positive integer, and credit $c_i=w_i$; and
   (A4) assigning the burst assembly time to the BATr.

3. The method as claimed in claim 1, wherein, step (B) further comprises the steps of:
   (B1) when a packet $P_i$ of flow i arrives, determining whether the credit $c_i$ of flow i is smaller than 1;
   (B2) if the credit $c_i$ of flow i is smaller than 1, assigning $c_i=c_i+w_i$, incrementing the window index $1w_i$, and executing step (B1) again; and
   (B3) if the credit $c_i$ of flow i is equal to or greater than 1, the packet $P_i$ is placed into the window pointed by the window index $1w_i$, and decrementing the credit $c_i$.

4. The method as claimed in claim 1, wherein step (C) further comprises the steps of:
   (C1) when the number of packets in the queue reaches a predefined maximum burst size or the burst assembly time is expired, transmitting a burst assembled by the packets;
   (C2) after a burst transmits completely, for each flow i such that window index $1w_i$ is equal to one of passed window indices, replacing $1w_i$ by new current window index and replacing $c_i$ by normalized weight $w_i$;
   (C3) after a burst transmits completely, replacing current window cw by a new current window index, wherein the new current window index points to the window which can be served next;
   (C4) after a burst transmits completely, replacing the burst assembly timer BATr by the burst assembly time; and
   (C5) starting to count the BATr.

5. The method as claimed in claim 4, wherein the burst assembly time is changeable.

6. The method as claimed in claim 4, wherein the burst assembly time is infinite.

7. The method as claimed in claim 4, wherein the burst assembly timer is decreased by time.

* * * * *